(12) United States Patent
Wang et al.

(10) Patent No.: US 12,466,378 B2
(45) Date of Patent: Nov. 11, 2025

(54) VEHICLE'S BRAKE SYSTEM AND A METHOD FOR BRAKING A VEHICLE

(71) Applicant: Haldex Brake Products Aktiebolag, Landskrona (SE)

(72) Inventors: Zi Wang, Shanghai (CN); Anders Lindqvist, Landskrona (SE)

(73) Assignee: Haldex Aktiebolag, Landskrona (SE)

( * ) Notice: Subject to any disclaimer, the term of this patent is extended or adjusted under 35 U.S.C. 154(b) by 175 days.

(21) Appl. No.: 18/212,351

(22) Filed: Jun. 21, 2023

(65) Prior Publication Data

US 2023/0331207 A1    Oct. 19, 2023

Related U.S. Application Data

(63) Continuation of application No. PCT/EP2021/087383, filed on Dec. 22, 2021.

(30) Foreign Application Priority Data

Dec. 23, 2020   (CN) .......................... 202011543833.4

(51) Int. Cl.
*B60T 13/74*   (2006.01)
*B60T 7/22*    (2006.01)
*B60T 8/88*    (2006.01)

(52) U.S. Cl.
CPC .............. *B60T 13/741* (2013.01); *B60T 7/22* (2013.01); *B60T 8/885* (2013.01); *B60T 2270/413* (2013.01)

(58) Field of Classification Search
CPC .......... B60T 13/741; B60T 7/22; B60T 8/885; B60T 2270/413; B60T 8/92; B60T 8/326
See application file for complete search history.

(56) References Cited

U.S. PATENT DOCUMENTS

| | | | |
|---|---|---|---|
| 2013/0253793 A1 | 9/2013 | Lee | |
| 2018/0229738 A1* | 8/2018 | Nilsson | B60T 7/12 |
| 2019/0168805 A1 | 6/2019 | Siskoy | |
| 2019/0324450 A1* | 10/2019 | Lurie | H04L 12/40026 |
| 2021/0114567 A1* | 4/2021 | Rebholz-Goldmann | ................... G01R 1/206 |
| 2022/0314946 A1* | 10/2022 | Brok | B60T 13/588 |

(Continued)

FOREIGN PATENT DOCUMENTS

| | | | |
|---|---|---|---|
| CN | 210258386 U | * | 4/2020 |
| DE | 10 2017 219 921 A1 | | 5/2019 |

(Continued)

OTHER PUBLICATIONS

International Search Report for PCT/EP2021/087383.

*Primary Examiner* — Joseph J Dallo
(74) *Attorney, Agent, or Firm* — Price Heneveld LLP

(57) ABSTRACT

The invention provides a vehicle's brake system and a method for braking a vehicle. The brake system comprises at least two control modules and a plurality of electromechanical brake devices. Each electromechanical brake device comprises a wheel end controller, a motor actuator and a friction brake driven by the motor actuator. Each control module receives a brake demand from a brake demand generating device and sends a control signal to each wheel end controller according to the brake demand. Each wheel end controller only responds to the control signals when the control signals received from the two control modules are consistent.

19 Claims, 4 Drawing Sheets

(56) References Cited

U.S. PATENT DOCUMENTS

| | | | |
|---|---|---|---|
| 2022/0314953 A1* | 10/2022 | Brok | B60T 13/745 |
| 2023/0115299 A1* | 4/2023 | Freund | B60W 50/0205 |
| | | | 701/70 |
| 2023/0339482 A1* | 10/2023 | Yang | B60W 50/029 |

FOREIGN PATENT DOCUMENTS

| | | | | |
|---|---|---|---|---|
| EP | 1 616 746 A2 | | 1/2006 | |
| EP | 3 647 134 A1 | | 5/2020 | |
| WO | WO-2019002475 A1 | * | 1/2019 | B60L 7/24 |
| WO | WO-2019210956 A1 | * | 11/2019 | B60T 13/268 |
| WO | WO-2021045976 A1 | * | 3/2021 | G06F 17/153 |
| WO | WO-2021115827 A1 | * | 6/2021 | B60T 13/662 |
| WO | WO-2022002902 A1 | * | 1/2022 | B60T 8/1708 |
| WO | WO-2022146721 A1 | * | 7/2022 | B60W 60/0011 |
| WO | WO-2022171480 A1 | * | 8/2022 | B60T 13/385 |
| WO | WO-2023114396 A1 | * | 6/2023 | B60W 50/0098 |

* cited by examiner

VEHICLE'S BRAKE SYSTEM AND A METHOD FOR BRAKING A VEHICLE

CROSS REFERENCE TO RELATED APPLICATIONS

This application is a continuation of International Application PCT/EP2021/087383 with an international filing date of Dec. 22, 2021 and claiming priority to co-pending Chinese Patent Application No. CN 202011543833.4 entitled "A vehicle's brake system and a method for braking a vehicle", filed on Dec. 23, 2020.

FIELD OF THE INVENTION

The present invention relates to vehicle braking technologies, and more particularly, to an electromechanical brake system and a braking method for responding to a brake demand generated by an autonomous system under a dual control module architecture.

BACKGROUND OF THE INVENTION

Along with the development of the automobile industry, people have higher and higher requirements on the intelligent degree of vehicles. Vehicle intelligence is typically represented by various auxiliary systems deployed on the vehicle that relieve the driver by controlling vehicle auto-drive, thereby improving vehicle driving comfort and convenience. The existing auxiliary systems include: Autonomous Emergency Braking System (AEB), Adaptive Cruise Control System (ACC), Steering By Brake System (SBB), and Advanced Driver Assistance System (ADAS). These systems with automatic driving function without driver intervention acquire the driving state of the vehicle through various sensors distributed on the vehicle, and then generate control signals through advanced processing algorithms to control drive system and a brake system of the vehicle, so as to realize the automatic driving of the vehicle.

Taking the autonomous emergency braking system as an example, when the autonomous emergency braking system detects that an obstacle exists in front of the vehicle and the vehicle is about to collide, the braking requirement can be output in time. In the case of brake steering, if the steering system cannot normally provide sufficient steering force, an Electronic Control Unit (ECU) may output a brake steering demand to enable the brake system to steer the vehicle based on the brake steering demand.

Different from the traditional brake system which adopts gas or liquid as an energy transmission medium, the energy transmission and the signal transmission of the electromechanical brake system (EMB) are realized in an electric form, so that the electromechanical brake system is a vehicle brake system which has a simple structure, quick response and environmental friendliness, and is one of the future development directions in the field of vehicle braking. Existing electromechanical brake systems have been developed to comprise redundant dual control modules and a plurality of final brake-producing electromechanical brake devices disposed at the wheel ends.

When the above-described automatic driving system generates an external braking demand signal, it is necessary for the electromechanical brake system to respond so as to perform a proper braking operation. However, for high level functional security systems, redundant control modules are often required to verify operational requirements or as a backup to failure scenarios.

Further prior art is known from European patent application EP 1 616 746 A2, German patent application DE 10 2017 219 921 A1, European patent application EP 3 647 134 A1 and US patent applications US 2019/0168805 A1 and US 2013/0253793 A1.

SUMMARY OF THE INVENTION

A brief summary on one or more aspects is given below to provide the basic understanding for these aspects. This summary is not an exhaustive overview of all the contemplated aspects and is neither intended to indicate critical or decisive elements of all aspects nor to attempt to define the scope of any or all aspects. Its sole purpose is to present some concepts of one or more aspects in a simplified form as a preface for a more detailed description presented later.

As described above, in order to solve the problem that the conventional electromechanical brake system with a dual control module and a multi-electromechanical brake device architecture cannot effectively respond to an external brake demand, the present invention provides a vehicle's brake system and a method for braking a vehicle, wherein the vehicle brake system can respond to the external brake demand in time by the method for braking the vehicle, thereby improving the function of the brake system.

One aspect of the present invention provides a vehicle's brake system, comprising at least two control modules and a plurality of electromechanical brake devices; each electromechanical brake device comprises a wheel end controller, a motor actuator and a friction brake driven by the motor actuator; each control module receives a brake demand from a brake demand generating device and sends a control signal to each wheel end controller according to the brake demand; each wheel end controller only responds to the control signals when the control signals received from the at least two control modules are consistent.

In an embodiment of the brake system, optionally, the brake demand generating device is an autonomous driving system with non-driver intervention.

Optionally, the autonomous driving system comprises one or more of an automatic emergency brake system, an adaptive cruise control system, a braking steering system and an advanced driving assistance system.

In an embodiment of the brake system, optionally, when any one of the at least two control modules fails, the brake system is switched to an safe mode, wherein in the safe mode, the wheel end controller only responds to the control signal sent by the control module without failure In each of the embodiments of the brake system described above, optionally, the at least two control modules receive brake demand from a same communication network via their respective nodes.

In each of the embodiments of the brake system described above, optionally, the at least two control modules respectively receive brake demand from the brake demand generating device via at least two communication networks.

Optionally, the at least two communication networks adopt different protocols.

Optionally, the at least two control modules verify the received brake demands and send the control signal to each wheel end controller according to the brake demands only when the brake demands are consistent.

In each of the embodiments of the brake system described above, optionally, only one control module of the at least two control modules receives the brake demand from the brake demand generating device and forwards the brake demand to the other control modules to generate control signals.

Another aspect of the present invention provides a method for braking a vehicle, the vehicle comprises a brake system, the brake system comprises at least two control modules and a plurality of electromechanical brake devices, each electromechanical brake device comprises a wheel end controller, a motor actuator and a friction brake driven by the motor actuator, wherein the method comprises: receiving a brake demand from a brake demand generating device and sending a control signal to each wheel end controller according to the brake demand by each control module; and responding to the control signal only when the control signals received from the at least two control modules are consistent by each wheel end controller.

In an embodiment of the method, optionally, the method further comprises: generating the brake demand by an autonomous driving system with non-driver intervention.

Optionally, the method further comprises: receiving brake demand from one or more of an automatic emergency brake system, an adaptive cruise control system, a braking steering system and an advanced driving assistance system.

In an embodiment of the method, optionally, the method further comprises: when any one of the at least two control modules fails, switching the brake system to an safe mode, wherein in the safe mode, the wheel end controller only responds to the control signal sent by the control module without failure.

In each of the embodiments of the method described above, optionally, the method further comprises: receiving brake demand from a same communication network by the at least two control modules via their respective nodes.

In each of the embodiments of the method described above, optionally, the method further comprises: respectively receiving brake demand from the brake demand generating device by the at least two control modules via at least two communication networks.

Optionally, the at least two communication networks adopt different protocols.

Optionally, the method further comprises: verifying the received brake demands and sending the control signal to each wheel end controller according to the brake demands by the at least two control modules only when the brake demands are consistent.

In each of the embodiments of the method described above, optionally, the method further comprises: receiving the brake demand from the brake demand generating device and forwarding the brake demand to the other control modules to generate control signals by only one control module of the at least two control modules.

According to the vehicle's brake system and the method for braking the vehicle, due to the fact that the redundant double control modules are arranged, the external brake requirement can be accurately and timely responded through setting the response logic of the wheel end controller, and the situation that the external brake requirement is triggered by mistake or cannot be responded is avoided.

Advantageous developments of the invention result om the claims, the description and the drawings.

The advantages of features and of combinations of a plurality of features mentioned at the beginning of the description only serve as examples and may be used alternatively or cumulatively without the necessity of embodiments according to the invention having to obtain these advantages.

The following applies with respect to the disclosure—not the scope of protection—of the original application and the patent: Further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims which, however, does not apply to the independent claims of the granted patent.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

After reading the detailed description of the embodiments of the present disclosure in combination with the following drawings, the above features and advantages of the invention can be better understood. In the drawings, the components are not necessarily drawn to scale, and components with similar related characteristics or features may have the same or similar reference marks.

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

The following description is presented to enable one of ordinary skill in the art to implement and use the present invention and incorporate it into the context of a particular application. Various modifications, as well as various usages in various applications, will be readily apparent to those skilled in the art, and the generic principles defined herein may be applicable to a wide range of embodiments. Thus, the present invention is not limited to the embodiments presented herein, but rather should be given its broadest scope consistent with the principles and novel features disclosed herein.

In the following detailed description, numerous specific details are set forth to provide a more thorough understanding of the present invention. However, it will be apparent to those skilled in the art that the present invention may be practiced without limitations from these specific details. In other words, well-known structures and devices are shown in a block diagram form and are not shown in detail, so as to avoid obscuring the present invention.

The invention is described in detail below with reference to the figures and the specific embodiments. It is noted that the aspects described below in connection with the figures and the specific embodiments are only illustrative and should not be construed as imposing any limitation on the scope of the present invention.

As described above, the present invention provides a vehicle's brake system and a method for braking the vehicle, by which the above-described brake system can timely respond to an external brake demand, thereby perfecting the function of the brake system.

Please refer to FIGS. 1 to 4 to understand the present invention of a vehicle's brake system and a method for braking a vehicle. An aspect of the present invention provides a vehicle's brake system comprising two redundant control modules 111 and 112 and a plurality of electromechanical brake devices controlled by the control modules 111 and 112 to provide braking force to wheels. In one embodiment, the brake system comprises four electromechanical brake devices, which may be disposed at the front right wheel 210A, the front left wheel 210B, the rear right wheel 210C, and the rear left wheel 210D of the vehicle respectively. More specifically, each of the electromechanical brake devices may further comprise a wheel end controller (the wheel end controller 211-214 in FIG. 1), a motor actuator and a friction brake driven by the motor actuator, and each of the wheel end controllers 211-214 can independently communicate with the control module 111 and 112, so as to provide a braking torque based on the electric signal output by the control module 111 and 112.

Figure 1:
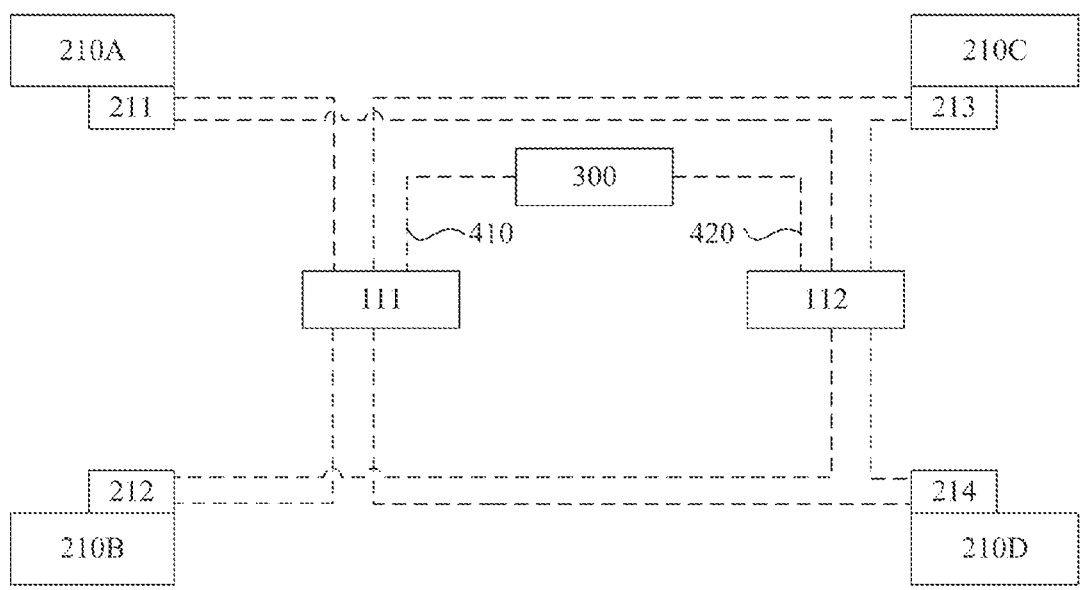
FIG. 1 shows a schematic structural diagram of an embodiment of a brake system according to the present invention.

In the exemplary embodiment shown in FIG. 1, the control module 111 and the control module 112 receive an external brake demand respectively from the external brake demand generating device 300 via their respective nodes from the same communication network 410. The control module 111 and the control module 112 respectively process the external brake requirement after receiving the external brake demand, convert the external brake demand into the control signals suitable for being sent to the wheel end controllers 211-214 for execution, and respectively send the processed control signals to the respective wheel end controllers 211-214.

Thus, each of the wheel end controllers 211-214 can substantially simultaneously receive control signals from the control module 111 and the control module 112 respectively. After receiving the control signals respectively outputted from the control module 111 and the control module 112, each of the wheel end controllers 211-214 responds to the control signal only when the control signals received from the control module 111 and the control module 112 are consistent, so as to control the motor actuator and the friction brakes driven thereby to provide braking torque according to the control signal.

The control signals are consistent embodied as: each of the wheel end controllers 211-214 receives the control signal, and the braking torques corresponding to the two control signals are the same, or the difference between the braking torques corresponding to the two control signals is within a preset threshold range. When each of the wheel end controllers 211-214 receives only one control signal in the embodiment as shown in FIG. 1, the control signal may be a noise signal or an error signal, and a response to the signal should be avoided. Similarly, if the difference between the two received control signals is large, it also means that there is a large disturbance on the communication link or the signals themselves are caused by sensor error or calculation error, and the braking torque actually required by the external brake demand generating device 300 cannot be determined from the two control signals with large difference, so that the response to the two control signals with large difference should be avoided.

As described above, the above-described external brake demand generating device 300 is an autonomous driving system without driver intervention. Further, the autonomous driving system described above comprises one or more of an automatic emergency brake system, an adaptive cruise control system, a braking steering system and an advanced driving assistance system. It should be noted that the above examples of the autonomous driving system without driver intervention are only illustrative, and the external braking demand generating device 300 may be any other device that is not human-intervened and can generate braking demand, and the specific implementation manner of the external braking demand generating device should not unduly limit the protection scope of the present invention.

It will be appreciated that the communication network 410 described above may be any existing or future communication network that implements any of a variety of application protocols. The communication network may be CAN, Flexray, Lin or Automotive Ethernet, and the application protocol may be one of SAE J1939/ISO11783, CANopen, CANaerospace, DeviceNet, NMEA 2000. The specific communication network protocol depends on the vehicle to which the brake system provided by the present invention is applied. In the embodiment shown in FIG. 1, the control module 111 and the control module 112 each independently occupy a node on the communication network 410, so that information CAN be independently interacted with the communication network 410.

Figure 2:
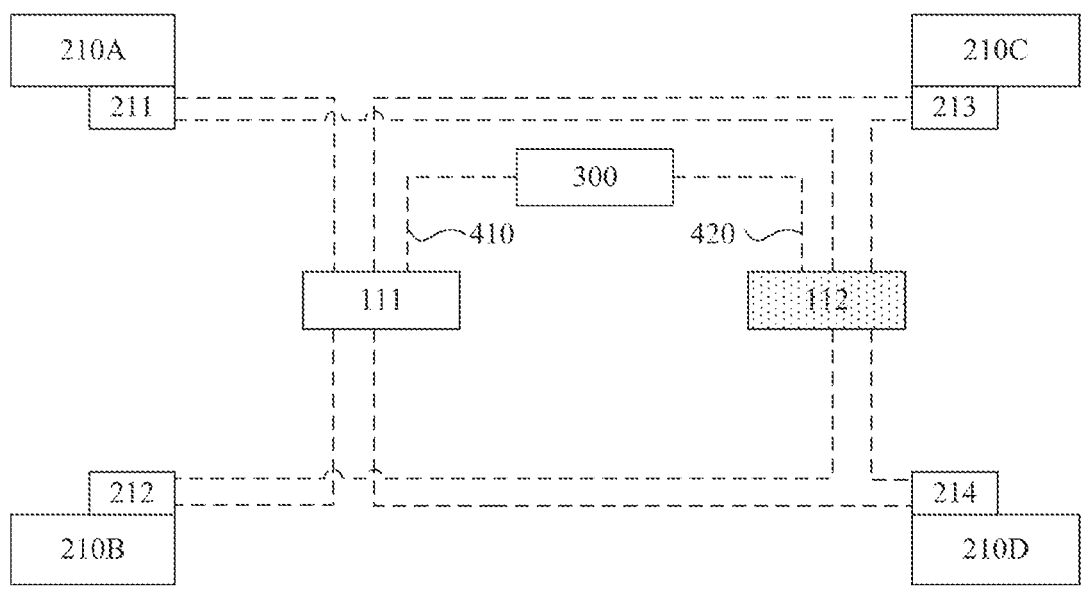
FIG. 2 shows a schematic structural diagram of another embodiment of the brake system according to the present invention.

Further, if one of the redundant dual control modules fails, as shown in FIG. 2, the control module 112 fails, the brake system switches to the safety mode at this time. In the safety mode, due to the failure of the control module 112, only the control module 111 processes the brake demand output by the external brake demand generating device 300, converts the brake demand into a control signal, and outputs the control signal to each wheel end controller 211-214. Due to the failure of the control module 112, even if each wheel end controller 211-214 still receives the instruction output by the control module 112, each wheel end controller 211-214 needs to be controlled to ignore the instruction from the control module 112, so as to prevent noise interference. It will be appreciated that in this safety mode, each wheel end controller 211-214 is only responsive to control signals from the non-failed control module, i.e., control module 111. The failure of the control modules can, exemplarily be detected by internal or external diagnostic program or diagnostic module. For example, based on the input or output data and operating condition, when the diagnostic program or diagnostic module finds hardware or software abnormality of the control module(s), according to the severity of the failure, the confidence of the control signals outputted by the control module with failure are downgraded or the output is cut off, and a warning of abnormality is sent so that the brake system switches to the safety mode.

Figure 3:
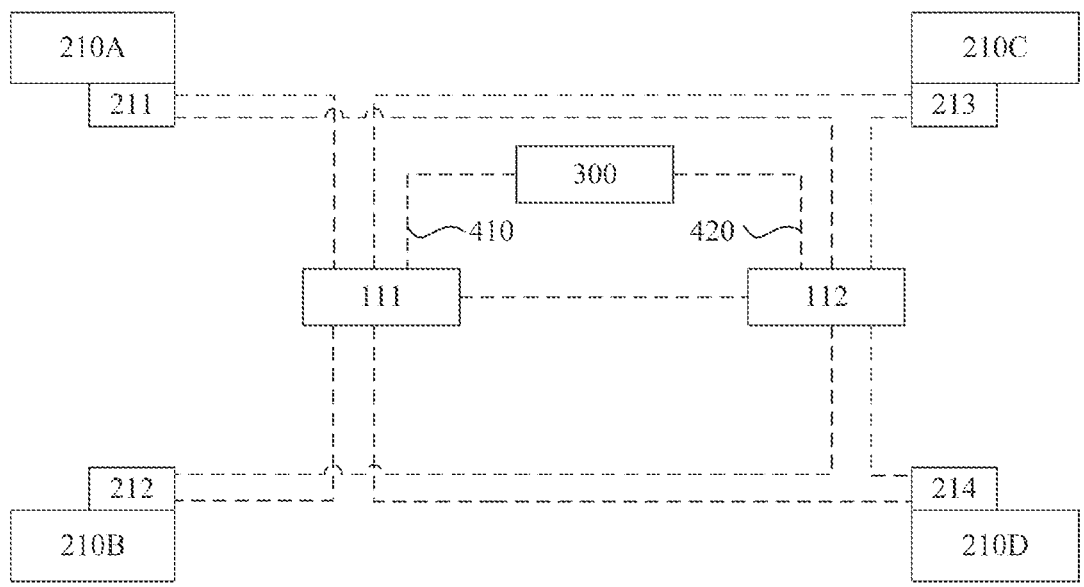
FIG. 3 shows a schematic structural diagram of another embodiment of the brake system according to the present invention.

In another embodiment, as shown in FIG. 3, the brake demand generated by the external brake demand generating device 300 is transmitted through the communication network 410 and the communication network 420 respectively, and the control module 111 and the control module 112 receive the brake demand output by the external brake demand generating device 300 from the communication network 410 and the communication network 420 respectively. In this embodiment, the control module 111 and the control module 112 respectively and independently occupy one node of the communication network 410 and the communication network 420, so that information can be independently interacted with the communication network 410 and the communication network 420.

In the above embodiments, the communication network 410 and the communication network 420 respectively use different application protocols, the application protocols can be SAE J1939/ISO11783, CANOpen, CANaerospace, DeviceNet, NMEA 2000, for example, the communication network 410 uses the application protocol of SAE J1939/ISO11783, and the communication network 420 uses the application protocol of CANOpen, thereby avoiding same information transmission error with same protocol so that safety is improved.

Further, in the embodiment shown in FIG. 3, after the control module 111 receives the brake demand from the external brake demand generating device 300 via the communication network 410 and the control module 112 receives the brake demand from the external brake demand generating device 300 via the communication network 410, first, the control module 111 and the control module 112 need to perform handshake so as to determine whether the brake demands received from the communication network 410 and the communication network 420 are consistent, and only when the brake demand received by the control module 111 from the communication network 410 is consistent with the brake demand received by the control module 112 from the communication network 420, the control module 111 and the control module 112 further process the received brake demand. The above-mentioned brake demand consistency means that the control module 111 and the control module 112 both receive the brake demand from the external brake demand generating device 300, and the brake torques or decelerations corresponding to the respective received brake demands are the same, or the difference between the brake torques or decelerations corresponding to the respective received brake demands is within a preset range, the brake demands obtained by the control modules 111 and 112 are both considered to be correct.

In the above embodiment, after the control module 111 and the control module 112 send the control signals to each wheel end controllers 211-214 respectively, the wheel end controllers 211-214 further determine whether the brake demands from the control module 111 and the control module 112 are consistent, and only when the brake demands from the control module 111 and the control module 112 are consistent, each wheel end controllers 211-214 will respond to the consistent brake demands.

In the above embodiment, when the applied vehicle is collocated with the communication networks with different application protocols, the redundant dual control modules can be respectively connected to the different communication networks, and the noise signal CAN be eliminated by determining whether the brake demands received from the different communication networks are consistent in advance, so that the external brake demand generating device 300 can be responded more accurately.

It can be understood that, in the embodiment shown in FIG. 3, if any one of the control module 111 and the control module 112 fails, the entire brake system switches into the safety mode with reference to the embodiment shown in FIG. 2, and each the wheel end controllers 211-214 only responds to the control signal output by the control module that does not fail, which is described above with reference to the embodiment shown in FIG. 2 and is not repeated herein.

Figure 4:
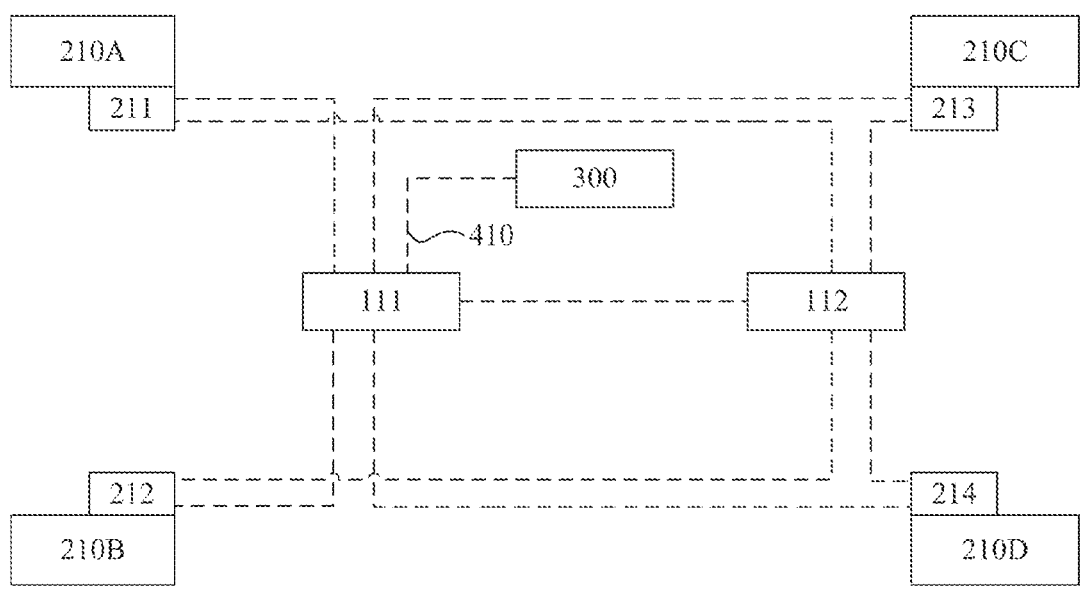
FIG. 4 shows a schematic structural diagram of another embodiment of the brake system according to the present invention.

In another embodiment, if the nodes of the communication network on the vehicle are limited, a plurality of independent nodes cannot be provided for each control module, and at this time, any one of the redundant dual control modules can be used as a main control module to be connected to the communication network of the vehicle, so as to obtain the external brake demand via the communication network. As shown in FIG. 4, the control module 111 may be selected as a main control module of the communication network 410, and the control module 111 can independently perform information interaction with the communication network 410 so as to receive the external brake demand from the external brake demand generating device 300 via the communication network 410.

In the above embodiment, when the control module 111 receives the external brake demand from the external brake demand generating device 300, the control module 111 forwards the received external brake demand to the control module 112 that is not connected to the communication network 410, so that both the control module 111 and the control module 112 receive the external brake demand. Subsequently, the control module 111 and the control module 112 independently process the external brake demand, convert the external brake demand into the control signals suitable for being sent to the wheel end controllers 211-214, and send the processed control signals to the wheel end controllers 211-214 respectively.

After receiving the control signals respectively outputted from the control module 111 and the control module 112, each of the wheel-end controllers 211-214 responds to the control signal only when the control signals received from the control module 111 and the control module 112 are consistent, so as to control the motor actuator and the friction brakes driven thereby to provide braking torque according to the control signal.

In the above embodiment, although only one control module accesses the communication network 410, by forwarding the external brake demand to another redundant control module and setting the response logic of each wheel end controller 211-214, the error caused by processing the external brake remand by a single control module can be avoided, and the correctness of the entire brake system responding to the external brake demand can be improved.

In the embodiment shown in FIG. 4, it can be understood that, if one of the redundant dual control modules that is not connected to the communication network 410 fails, referring to the embodiment shown in FIG. 2, the entire brake system switches into the safety mode, and each of the wheel end controllers 211-214 only responds to the control signal from the control module that without failure, that is, the control signal from the control module 111 connected to the communication network 410, which is specifically described with reference to the description about the embodiment shown in FIG. 2 and is not repeated herein.

Thus, a specific implementation of a method of responding to an external brake demand in a brake system having redundant dual control modules has been described. According to the brake system according to the invention, the response logic of the wheel end controller to the double control module is adjusted, so that the external brake demand triggered by response error can be avoided, and the external brake demand can be accurately and timely responded in different application environments.

Another aspect of the present invention also provides a method for braking a vehicle, the vehicle comprises a brake system, the brake system comprises at least two control modules and a plurality of electromechanical brake devices, each electromechanical brake device comprises a wheel end controller, a motor actuator and a friction brake driven by the motor actuator, wherein the method comprises: receiving a brake demand from a brake demand generating device and sending a control signal to each wheel end controller according to the brake demand by each control module; and responding to the control signal only when the control signals received from the at least two control modules are consistent by each wheel end controller.

In an embodiment of the method, optionally, the brake demand generating device is an autonomous driving system with non-driver intervention. Further, the autonomous driving system comprises one or more of an automatic emergency brake system, an adaptive cruise control system, a braking steering system and an advanced driving assistance system.

In an embodiment of the method, optionally, the method further comprises: when any one of the at least two control modules fails, switching the brake system to an safe mode, wherein in the safe mode, the wheel end controller only responds to the control signal sent by the control module without failure.

In each of the embodiments of the method described above, optionally, the method further comprises: receiving brake demand from a same communication network by the at least two control modules via their respective nodes.

In each of the embodiments of the method described above, optionally, the method further comprises: respectively receiving brake demand from the brake demand generating device by the at least two control modules via at least two communication networks. Further, the at least two communication networks adopt different protocols. More preferably, the method further comprises: verifying the received brake demands and sending the control signal to each wheel end controller according to the brake demands by the at least two control modules only when the brake demands are consistent.

In each of the embodiments of the method described above, optionally, the method further comprises: receiving the brake demand from the brake demand generating device and forwarding the brake demand to the other control modules to generate control signals by only one control module of the at least two control modules.

The specific implementation method of the method for braking the vehicle according to another aspect of the present invention may refer to the process of implementing braking the vehicle by the brake system according to the present invention, and will not be described in detail herein.

According to the vehicle's brake system and the method for braking vehicle, due to the fact that the redundant double control modules are arranged, the external brake demand can be accurately and timely responded through setting the response logic of the wheel end controller, and the situation that the external brake demand is triggered by mistake or cannot be responded is avoided.

A person skilled in the art would understand that information, signals, and data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

It will be further appreciated by a person skilled in the art that various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Many variations and modifications may be made to the preferred embodiments of the invention without departing substantially from the spirit and principles of the invention. All such modifications and variations are intended to be included herein within the scope of the present invention, as defined by the following claims.

We claim:

1. A vehicle's brake system, comprising at least two control modules; and a plurality of electromechanical brake devices;

wherein each electromechanical brake device comprises a wheel end controller, a motor actuator and a friction brake driven by the motor actuator;

wherein each control module receives a brake demand from a brake demand generating device and sends a control signal to each wheel end controller according to the brake demand; and wherein each wheel end controller only responds to the control signals when the control signals received from the at least two control modules are consistent.

2. The brake system according to claim 1, wherein that the brake demand generating device is an autonomous driving system with non-driver intervention.

3. The brake system according to claim 2, wherein the autonomous driving system comprises one or more of an automatic emergency brake system, an adaptive cruise control system, a braking steering system and an advanced driving assistance system.

4. The brake system according to claim 1, wherein when any one of the at least two control modules fails, the brake system is switched to a safe mode, wherein in the safe mode, the wheel end controller only responds to the control signal sent by the control module without the failure.

5. The brake system according to claim 1, wherein the at least two control modules receive a brake demand from the same communication network via their respective nodes.

6. The brake system according to claim 1, wherein the at least two control modules respectively receive brake demands from the brake demand generating device via at least two communication networks.

7. The brake system according to claim 6, wherein the at least two communication networks adopt different protocols.

8. The brake system according to claim 6, wherein the at least two control modules verify the received brake demands and send the control signal to each wheel end controller according to the brake demands only when the brake demands are consistent.

9. The brake system according to claim 7, wherein the at least two control modules verify the received brake demands and send the control signal to each wheel end controller according to the brake demands only when the brake demands are consistent.

10. The brake system according to claim 1, wherein only one control module of the at least two control modules receives the brake demand from the brake demand generating device and forwards the brake demand to the other control modules to generate control signals.

11. A method for braking a vehicle, wherein the vehicle comprises a brake system, the brake system comprises at least two control modules and a plurality of electromechanical brake devices, each electromechanical brake device comprises a wheel end controller, a motor actuator and a friction brake driven by the motor actuator, the method comprising:

receiving a brake demand from a brake demand generating device and sending a control signal to each wheel end controller according to the brake demand by each control module; and responding to the control signal only when the control signals received from the at least two control modules are consistent by each wheel end controller.

12. The method according to claim 11, further comprising:

generating the brake demand by an autonomous driving system without driver intervention.

13. The method according to claim 12, further comprising:

receiving brake demand from one or more of an automatic emergency brake system, an adaptive cruise control system, a braking steering system and an advanced driving assistance system.

14. The method according to claim 11, further comprising:

when any one of the at least two control modules fails, switching the brake system to an safe mode, wherein in the safe mode, the wheel end controller only responds to the control signal sent by the control module without failure.

15. The method according to claim 11, further comprising:

receiving brake demand from a same communication network by the at least two control modules via their respective nodes.

16. The method according to claim 11, further comprising:

respectively receiving brake demand from the brake demand generating device by the at least two control modules via at least two communication networks.

17. The method according to claim 16, wherein the at least two communication networks adopt different protocols.

18. The method according to claim 16, further comprising:

verifying the received brake demands and sending the control signal to each wheel end controller according to the brake demands by the at least two control modules only when the brake demands are consistent.

19. The method according to claim 11, further comprising:

receiving the brake demand from the brake demand generating device and forwarding the brake demand to the other control modules to generate control signals by only one control module of the at least two control modules.

* * * * *